(12) United States Patent
Maekawa

(10) Patent No.: US 8,354,766 B2
(45) Date of Patent: Jan. 15, 2013

(54) PERMANENT MAGNET MOTOR AND WASHING MACHINE PROVIDED THEREWITH

(75) Inventor: Sari Maekawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 640 days.

(21) Appl. No.: 12/624,808

(22) Filed: Nov. 24, 2009

(65) Prior Publication Data

US 2010/0126234 A1 May 27, 2010

(30) Foreign Application Priority Data

Nov. 25, 2008 (JP) ................................ 2008-299427

(51) Int. Cl.
*H02K 21/12* (2006.01)
(52) U.S. Cl. ............................ 310/156.43; 310/156.56
(58) Field of Classification Search ............ 310/156.43–156.45, 156.53, 156.56
See application file for complete search history.

(56) References Cited

U.S. PATENT DOCUMENTS

| 7,923,879 | B2 * | 4/2011 | Nitta | 310/156.44 |
| 8,044,548 | B2 * | 10/2011 | Sakai et al. | 310/156.43 |
| 8,076,812 | B2 * | 12/2011 | Hiroshi | 310/156.38 |
| 2006/0049705 | A1 * | 3/2006 | Matsubara et al. | 310/81 |

FOREIGN PATENT DOCUMENTS

| CN | 1747292 A | 3/2006 |
| JP | 2006-74949 | 3/2006 |
| JP | 2006-280195 | 10/2006 |

OTHER PUBLICATIONS

Office Action issued Jun. 9, 2011 in Chinese Patent Application No. 200910226546.8 (with English translation).
Office Action issued Apr. 5, 2011, in Japanese Patent Application No. 2008-299427 with English translation.

* cited by examiner

*Primary Examiner* — Dang Le
(74) *Attorney, Agent, or Firm* — Oblon, Spivak, McClelland, Maier & Neustadt, L.L.P.

(57) ABSTRACT

A permanent magnet motor includes a rotor and a stator, a plurality of permanent magnets forming a plurality of magnetic poles in a core of the rotor and magnetic pole teeth located so as to correspond to phase windings of the stator. The permanent magnets include a plurality of types of permanent magnets having different coercive forces and arranged substantially into an annular shape so that one type of the permanent magnet constitutes each magnetic pole. The permanent magnets each having a relatively smaller coercive force are arranged at a first interval in the rotor, and the magnetic pole teeth corresponding to the same phase windings are arranged at a second interval differing from the first interval in the stator.

18 Claims, 14 Drawing Sheets

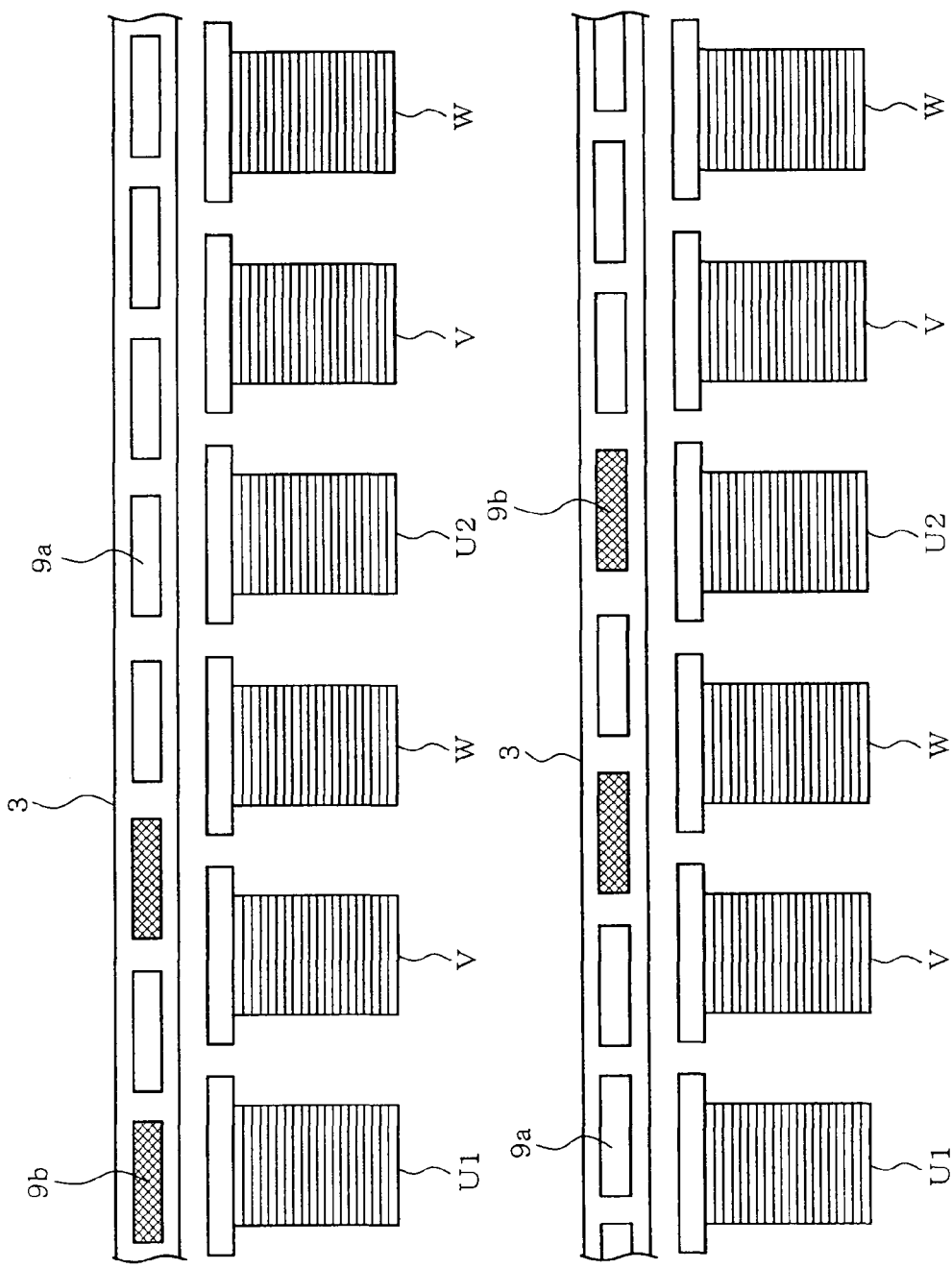

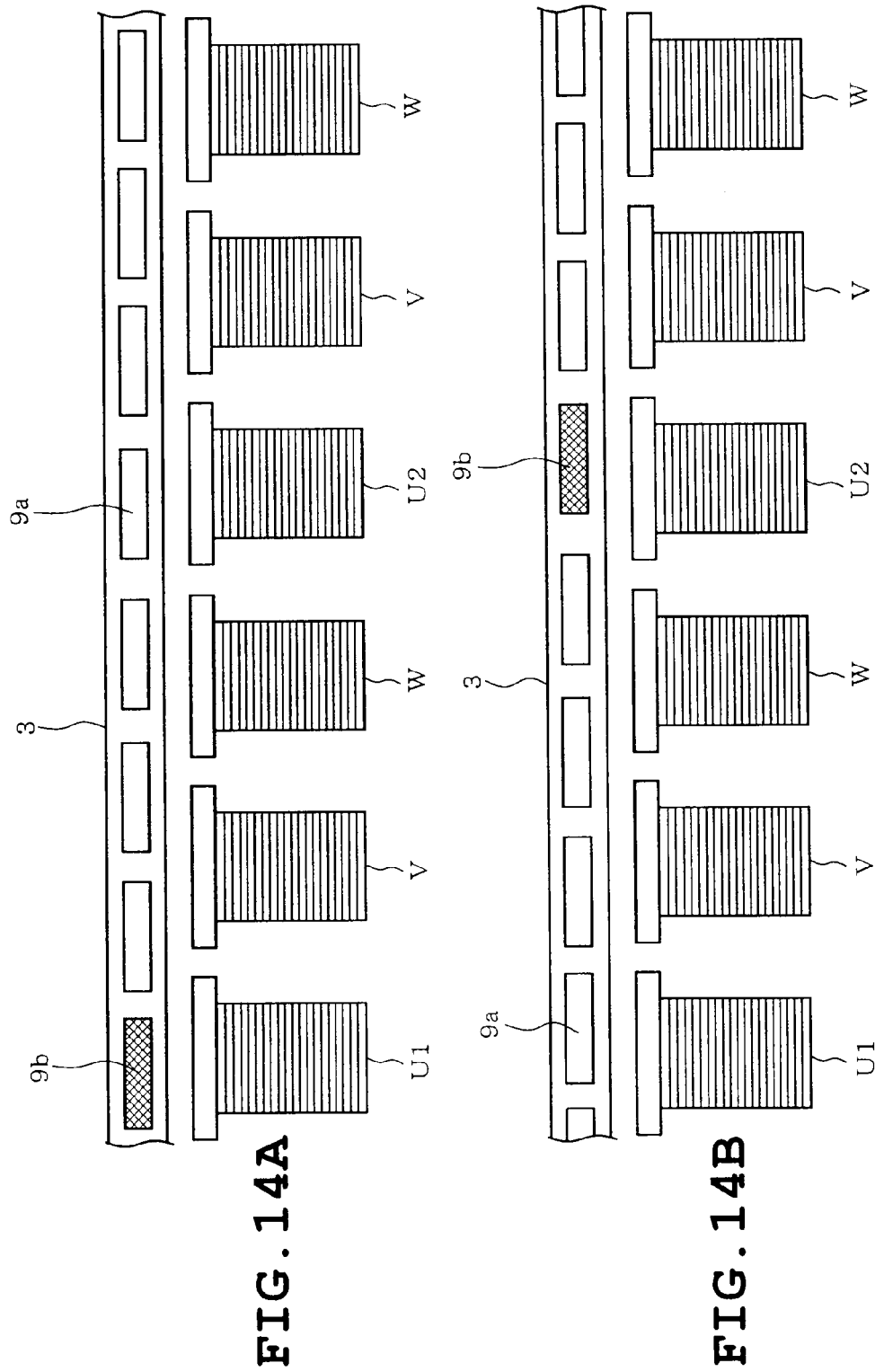

PERMANENT MAGNET MOTOR AND WASHING MACHINE PROVIDED THEREWITH

CROSS-REFERENCE TO RELATED APPLICATIONS

This application is based on and claims the benefit of priority from the prior Japanese Patent Application No. 2008-299427, filed on Nov. 25, 2008, the entire contents of which are incorporated herein by reference.

BACKGROUND OF THE INVENTION

1. Field of the Invention

The present invention relates to a permanent magnet motor comprising a plurality of permanent magnets provided in a rotor core and a washing machine provided with the permanent magnet motor.

2. Description of the Related Art

Magnetic flux is generated by permanent magnets in a permanent magnet motor of the above-described type. The magnetic flux is interlinked with stator windings. It has been desired that an amount of magnetic flux interlinked with stator windings (an amount of interlinkage magnetic flux) should properly be adjusted according to load driven by the permanent magnet motor. However, permanent magnets provided in permanent magnet motors are generally composed of a single type of permanent magnet. Accordingly, an amount of magnetic flux of the permanent magnets is usually constant. For example, when a permanent magnet motor comprises permanent magnets each with a large coercive force, voltage induced by the permanent magnets during high-speed rotation is rendered excessively high, resulting in possible breakdown of electronic components. On the other hand, when a permanent magnet motor comprises permanent magnets each with a small coercive force, output power during low speed rotation is reduced.

For example, Japanese patent application publication, JP-A-2006-280195 discloses a permanent magnet motor comprising two types of permanent magnets with different coercive forces provided in a rotor core. In the disclosed permanent magnet motor, the permanent magnets with a smaller coercive force are magnetized or demagnetized by an external magnetic field due to armature reaction (a magnetic field generated by electric current flowing into stator winding), whereby an amount of magnetic flux of the permanent magnets is adjusted.

However, both permanent magnets with larger and smaller coercive forces are disposed in each part constituting one magnetic pole inside a rotor core in the permanent magnet motor disclosed by the above-referenced publication. More specifically, the permanent magnet motor of the above-referenced publication is constructed so that one magnetic pole is formed by a plurality of types of permanent magnets. As a result, the number of permanent magnets is increased and a cubic volume of each magnet needs to be rendered smaller, whereupon the structure of the motor is complicated.

In view of the above-described problem, a permanent magnet motor with a simplified structure has recently been proposed. In the proposed motor, two types of permanent magnets having different coercive forces are disposed alternately per pole. In this permanent magnet motor, however, the magnets each having a larger coercive force and the magnets each having a smaller coercive force are in the component ratio of 1:1. Furthermore, a residual flux density of each permanent magnet with the smaller coercive force is smaller than a residual flux density of each permanent magnet with the larger coercive force. Accordingly, a total amount of magnetic flux of the permanent magnet motor is extremely lower than in the case where the rotor of the permanent magnet motor includes only the permanent magnets each having a larger coercive force.

The total amount of magnetic flux of the permanent magnet motor can be increased when the percentage of the permanent magnets with the smaller coercive force in all the permanent magnets is appropriately reduced. However, the amount of magnetic flux is rendered non-uniform when the aforesaid percentage of the permanent magnets each with the smaller coercive force is reduced in a permanent magnet motor wherein one type of permanent magnet is disposed per pole. This increases the torque ripple and cogging torque, resulting in production of noise and/or oscillation or vibration.

BRIEF SUMMARY OF THE INVENTION

Therefore, an object of the present invention is to provide a permanent magnet motor which includes a plurality of types of permanent magnets and in which an amount of magnetic flux generated by the permanent magnets can be adjusted according to load to be driven, by a simpler construction one type of permanent magnet is used per pole and in which amounts of torque ripple and cogging torque can be suppressed even when the percentage of the permanent magnets each having a smaller coercive force is rendered lower.

According to one aspect of the present invention, there is provided a permanent magnet motor which includes a rotor and a stator, comprising a plurality of permanent magnets forming a plurality of magnetic poles in a core of the rotor; and magnetic pole teeth provided so as to correspond to phase windings of the stator, wherein the permanent magnets include a plurality of types of permanent magnets having different coercive forces and arranged substantially into an annular shape so that one type of the permanent magnet constitutes each magnetic pole; and the permanent magnets each having a relatively smaller coercive force are arranged at a first interval in the rotor, and the magnetic pole teeth corresponding to the same phase windings are arranged at a second interval differing from the first interval in the stator.

According to the above-described construction, non-uniformity in an amount of flux can be suppressed even when a plurality of types of permanent magnets having different coercive forces (the permanent magnets having different residual flux densities). This can suppress the torque ripple and cogging torque each produced due to non-alternate arrangement of permanent magnets having smaller and larger coercive forces.

According to another aspect of the invention, there is provided a washing machine comprising a permanent magnet motor which includes a rotor, a stator, a plurality of permanent magnets forming a plurality of magnetic poles in a core of the rotor, and magnetic pole teeth provided so as to correspond to phase windings of the stator; and a control which controls drive of the permanent magnet motor, wherein the permanent magnet motor includes a plurality of types of permanent magnets having different coercive forces and forming a plurality of magnetic poles in a core of a rotor, the permanent magnets being arranged substantially into an annular shape so that one type of the permanent magnet constitutes each magnetic pole, and magnetic pole teeth provided so as to correspond to phase windings of the stator; the permanent magnets include a plurality of types of permanent magnets having different coercive forces and arranged substantially into an annular shape so that one type of the permanent magnet constitutes each magnetic pole; the permanent magnets each having a relatively smaller coercive force are arranged at a first interval in the rotor, and the magnetic pole teeth corresponding to the same phase windings are arranged at a second interval differing from the first interval in the stator; and the control is arranged so as to change a magnetization state of the permanent magnets having a relatively smaller coercive force.

BRIEF DESCRIPTION OF THE DRAWINGS

In the accompanying drawings:

FIGS. 9A and 9B are views for explaining voltage induced when permanent magnets whose number has been reduced by half are arranged at irregular intervals;

FIGS. 14A and 14B are views similar to FIGS. 9A and 9B respectively.

DETAILED DESCRIPTION OF THE INVENTION

Figure 1:
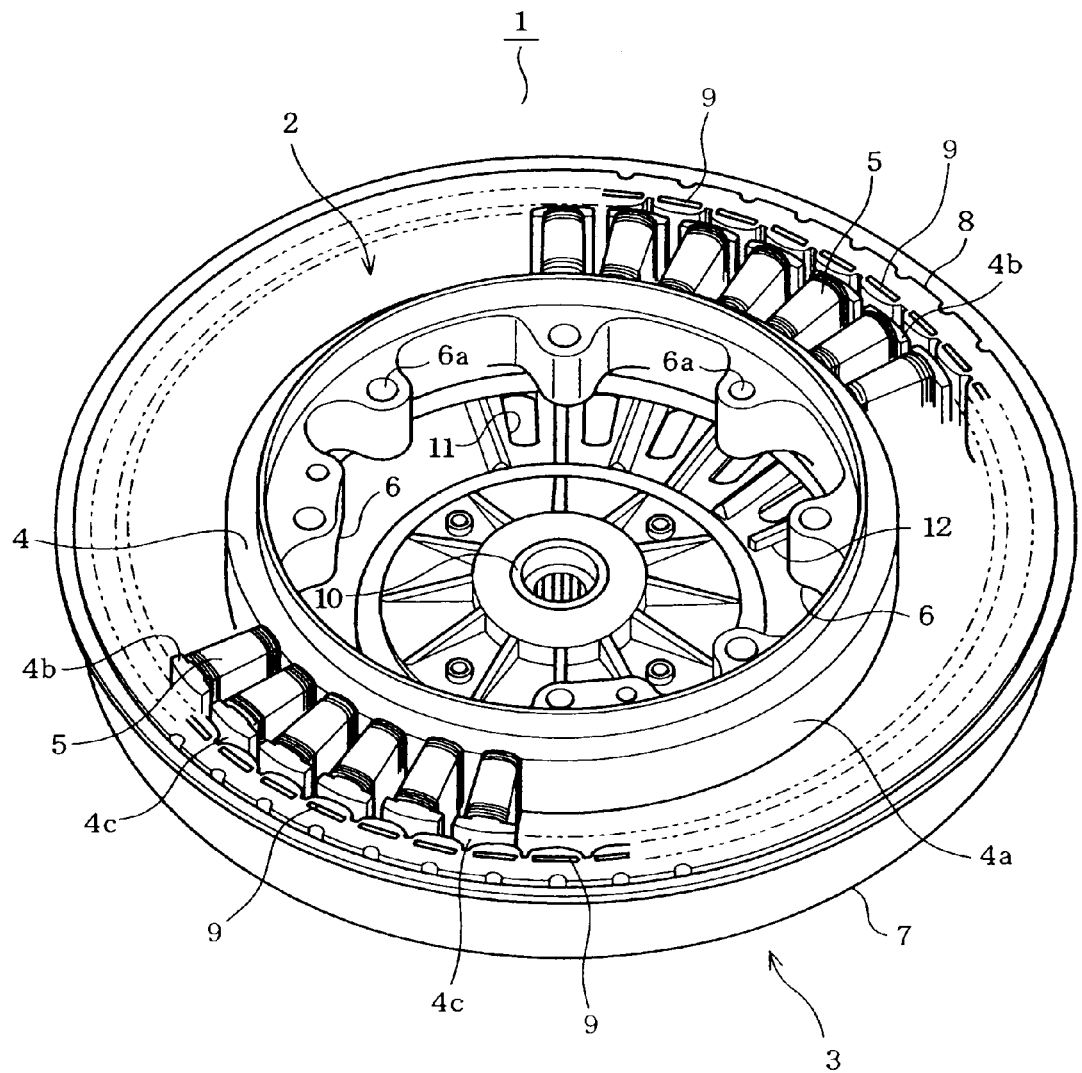
FIG. 1 is a schematic perspective view of an overall permanent magnet motor in accordance with a first embodiment of the present invention.
Figure 2:
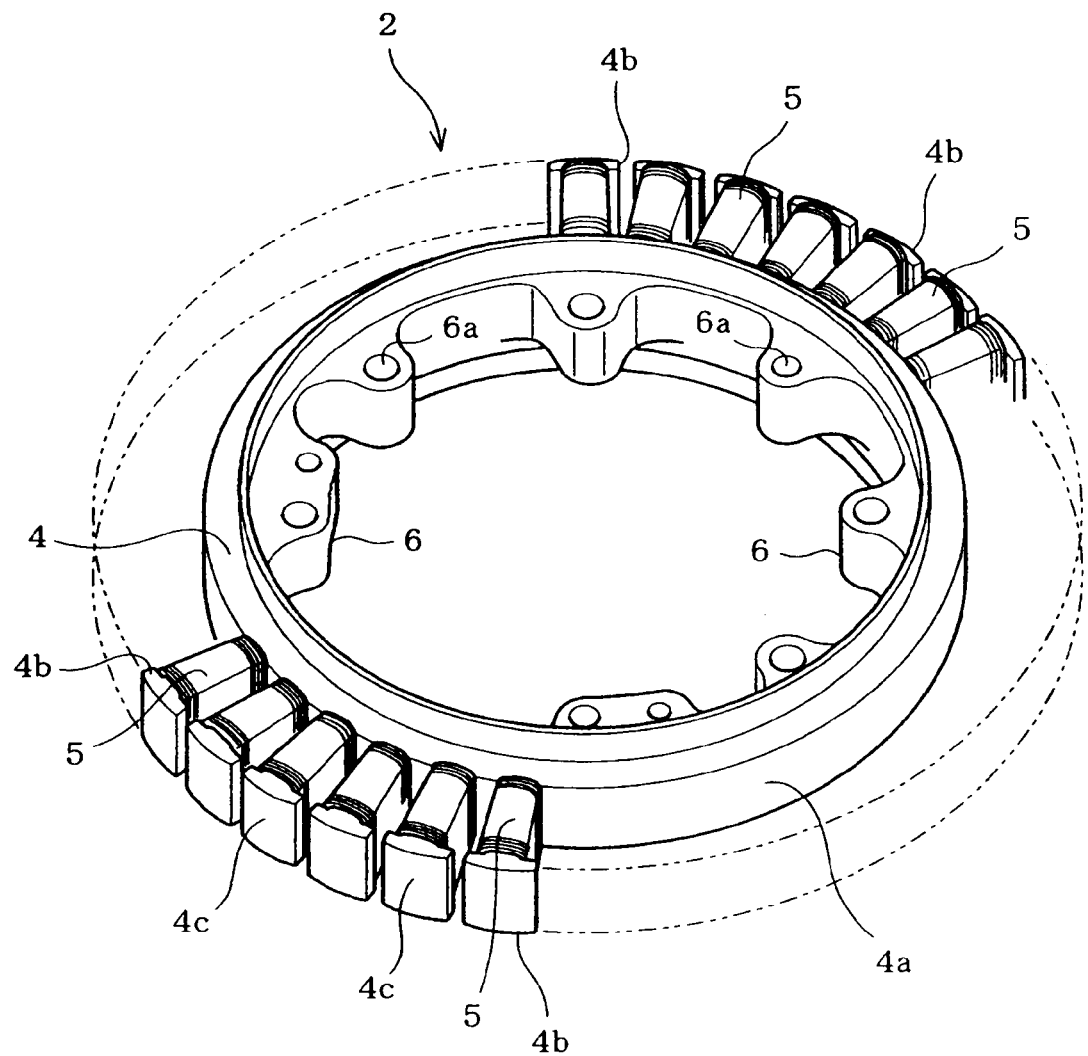
FIG. 2 is a schematic perspective view of a stator of the motor.

A first embodiment of the present invention will be described with reference to FIGS. 1 to 12 of the accompanying drawings. Referring to FIG. 1, the entire construction of a permanent magnet motor 1 (a brushless motor of the outer rotor type) of the embodiment is shown. The permanent magnet motor 1 comprises a stator 2 and a rotor 3 provided along an outer circumference of the stator 2. The stator 2 comprises a stator core 4 and a plurality of stator windings 5 as shown in FIGS. 1 and 2. The stator core 4 is formed by stacking and pressing a number of silicon steel plates serving as a punched soft magnetic material. The stator core 4 includes an annular yoke 4a and a number of teeth 4b protruding radially from an outer circumference of the yoke 4a. The stator core 4 has a surface covered with a polyethylene terephthalate (PET) resin (molded resin) except for outer circumferential faces 4c which cooperate with an inner circumference of the rotor 3 thereby to define a gap therebetween. Furthermore, a plurality of mounting portions 6 are formed integrally along the inner circumference of the stator 2. The mounting portions 6 have respective screw holes 6a. The mounting portions 6 are screwed so that the stator 2 is secured to the rear of a water tub 25 (see FIG. 11) of a drum type washing and drying machine 21. The stator winding 5 comprises a three-phase winding, for example and is wound on the teeth 4b.

Figure 3:
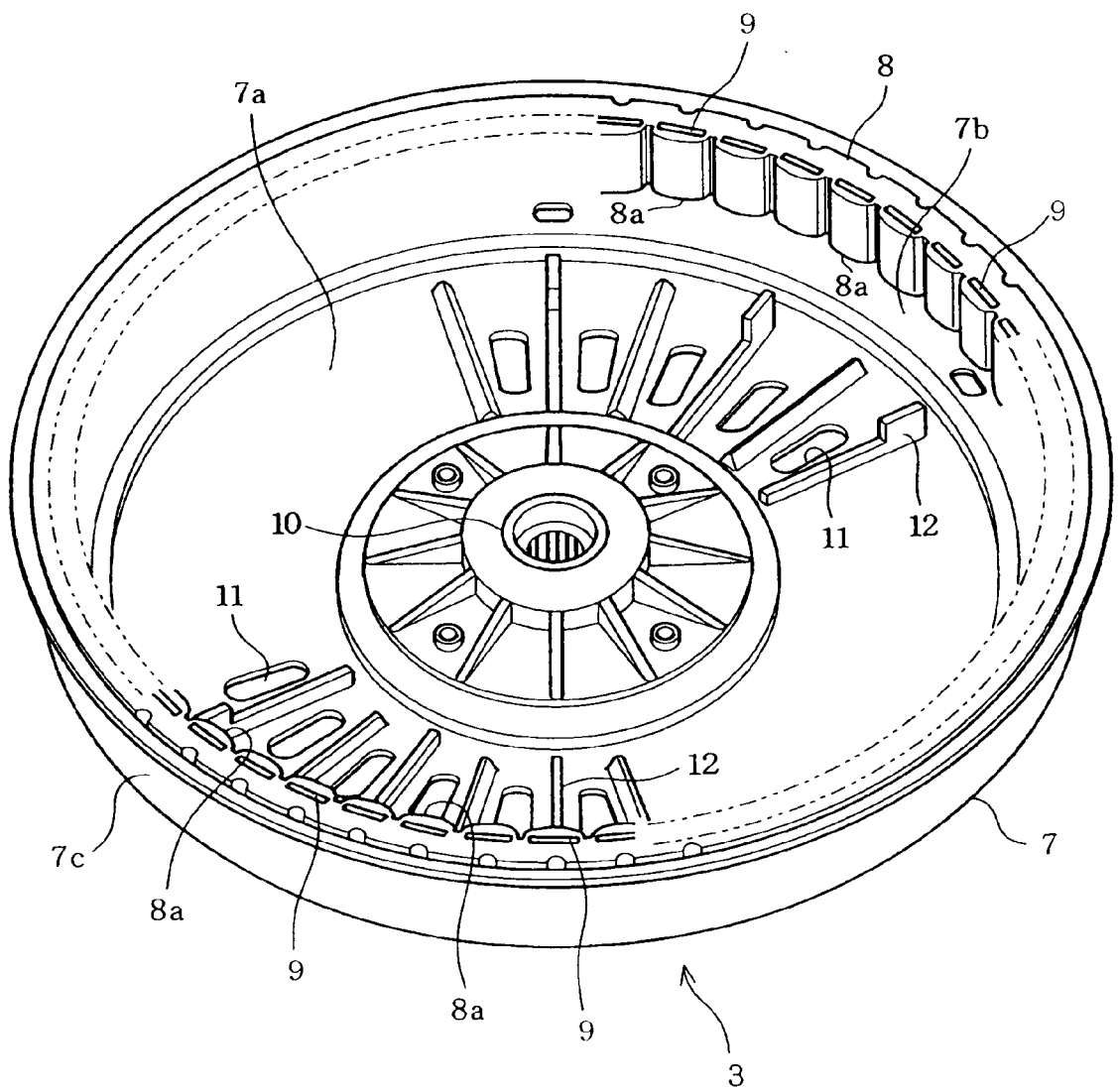
FIG. 3 is a schematic perspective view of a rotor of the motor.

The rotor 3 comprises a frame 7, a rotor core 8 and a plurality of permanent magnets 9 all of which are integrated with one another by molded resin (not shown) as shown in FIGS. 1 and 3. The frame 7 is formed by pressing an iron plate into a flat bottomed cylindrical shape. The frame 7 includes a circular main plate 7a and a circumferential wall 7c rising from an outer circumference of the main plate 7a with a stepped portion 7b being interposed therebetween. The main plate 7a includes a centrally formed shaft mount 10 to which a rotational shaft 26 (see FIG. 11) is mounted. The main plate 7a has a plurality of vent holes 11 and a plurality of ribs 12 both of which are formed to extend radially about the shaft mount 10.

The rotor core 8 is made by stacking and pressing a number of silicon steel plates serving as a soft magnetic material punched out substantially annularly. The rotor core 8 is disposed along an inner circumference of the circumferential wall 7c. The rotor core 8 has a plurality of protrusions 8a each of which protrudes inward from an inner circumferential surface thereof into an arc shape, whereupon the inner circumferential surface is formed into a rugged shape. The inner circumferential surface of the rotor core 8 is opposed to an outer circumferential surface of the stator 2 (an outer circumferential surface of the stator core 4) thereby to define a gap in cooperation with the stator 2.

Figure 4:
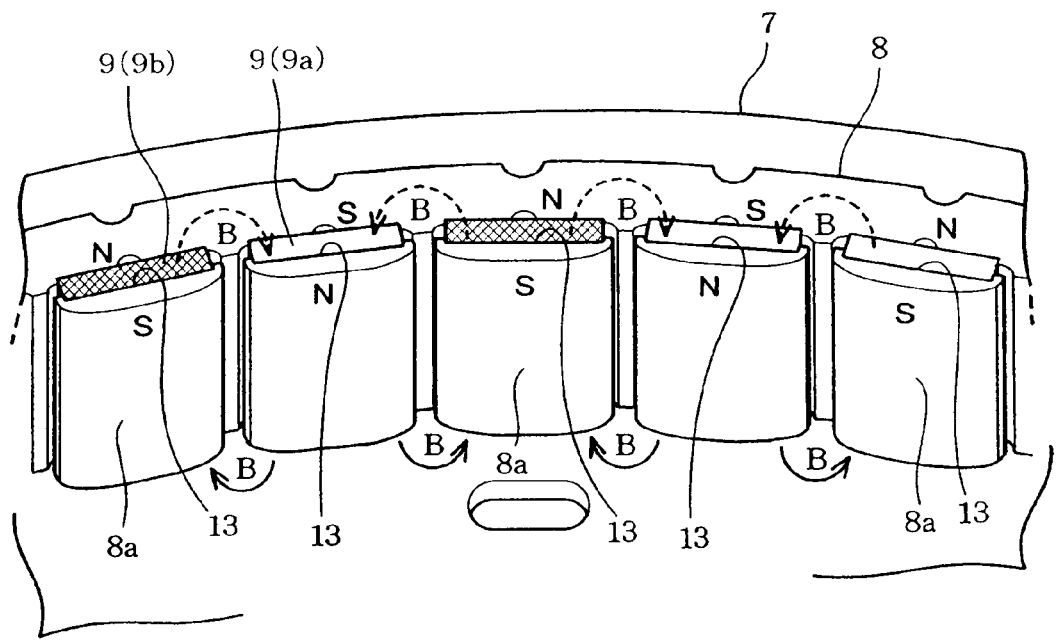
FIG. 4 is a partially enlarged view of a part of the rotor.

Referring now to FIG. 4, a plurality of, for example, forty-eight, insertion holes 13 are formed in the protrusions 8a so as to extend axially through the rotor core 8 (the direction in which the silicon steel plates are stacked), respectively. Only five insertion holes 13 are shown in FIG. 4. The insertion holes 13 have respective rectangular openings. The insertion holes 13 are disposed annularly along the rotor core 8. Each insertion hole 13 has a short side (a radial dimension with respect to the motor 1) with the length of 2.1 mm, a long side (a circumferential dimension with respect to the motor 1) with the length of 12.0 mm and a depth (the front-back direction with respect to the motor 1) of 19.0 mm. The insertion holes 13 are arranged circumferentially with respect to the rotor core 8.

The permanent magnets 9 are each formed into a rectangular shape and are inserted into the insertion holes 13 respectively. Each permanent magnet 9 has substantially an entire circumference surrounded by the rotor core 8 (the part of the insertion hole 13) made of a soft magnetic material thereby to be held in position. The permanent magnets 9 include one or a plurality of neodymium magnets 9a each of which has a larger coercive force and one or a plurality of samarium-cobalt magnets 9b each of which has a smaller coercive force. Thus, each permanent magnet 9a comprises a neodymium magnet belonging to a rare-earth magnet, whereas each permanent magnet 9b comprises a samarium-cobalt magnet belonging to the rare-earth magnet. Each neodymium magnet 9a is shown as outlined and each samarium-cobalt magnet 9b is shown as hatched in the drawings.

Each neodymium magnet 9a has a coercive force of about 900 kA/m, whereas each samarium-cobalt magnet 9b has a coercive force ranging from about 200 to 500 kA/m. Accordingly, each neodymium magnet 9a has a coercive force 1.8 to 4.5 times larger than each samarium-cobalt magnet 9b. Thus, the permanent magnets 9 include two types of permanent magnets 9a and 9b having different coercive forces. The permanent magnets 9a and 9b are arranged into an annular disposition. The permanent magnets 9 are arranged so that the boundary between the permanent magnets 9a and 9b adjacent to each other is electrically out of phase with two nearest boundaries between the permanent magnets.

Figure 5:
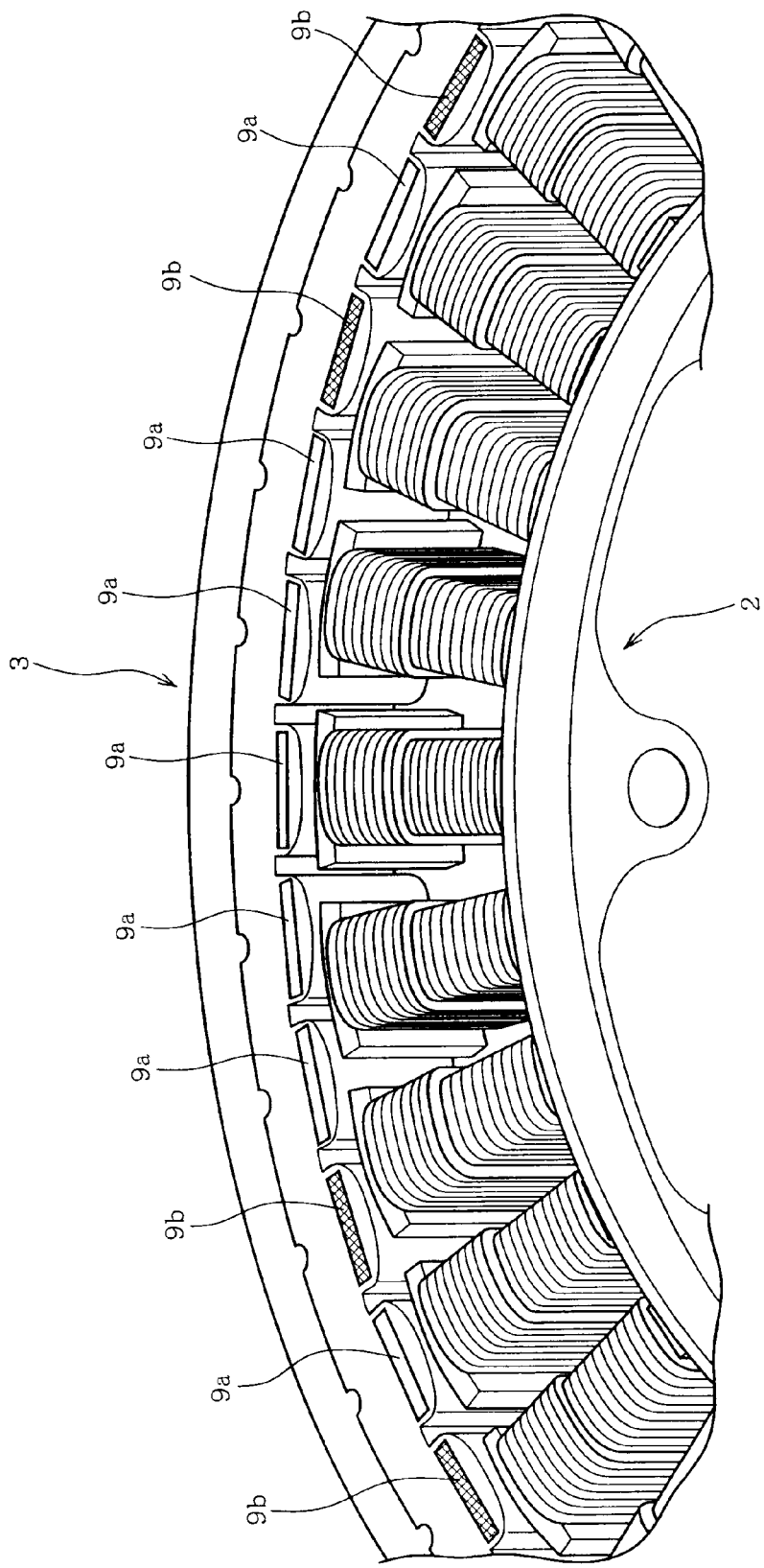
FIG. 5 is a partially enlarged perspective view of the permanent magnet motor, showing the arrangement that permanent magnets each having a smaller coercive force, the number of which is reduced, are arranged at irregular intervals.

The permanent magnet motor 1 is composed into a 48-pole 36-slot winding arrangement. Each group of six slots corresponds to eight poles. In this case, five neodymium magnets 9a, one samarium-cobalt magnet 9b, one neodymium magnet 9a and one samarium-cobalt magnet 9b are arranged sequentially into each one set as shown in FIG. 5. The permanent magnet motor 1 (the rotor 3) comprises six such sets of the permanent magnets 9a and 9b arranged sequentially. In this arrangement, the magnets 9a each having a larger coercive force and the magnets 9b each having a smaller coercive force are in the component ratio of 3:1. More specifically, the two types of permanent magnets 9a and 9b have different numbers of poles. Furthermore, the component ratio is set so that the number of neodymium magnets 9a each having the larger coercive force is larger than the number of samarium-cobalt magnets 9b each having the relatively smaller coercive force.

Figure 6:
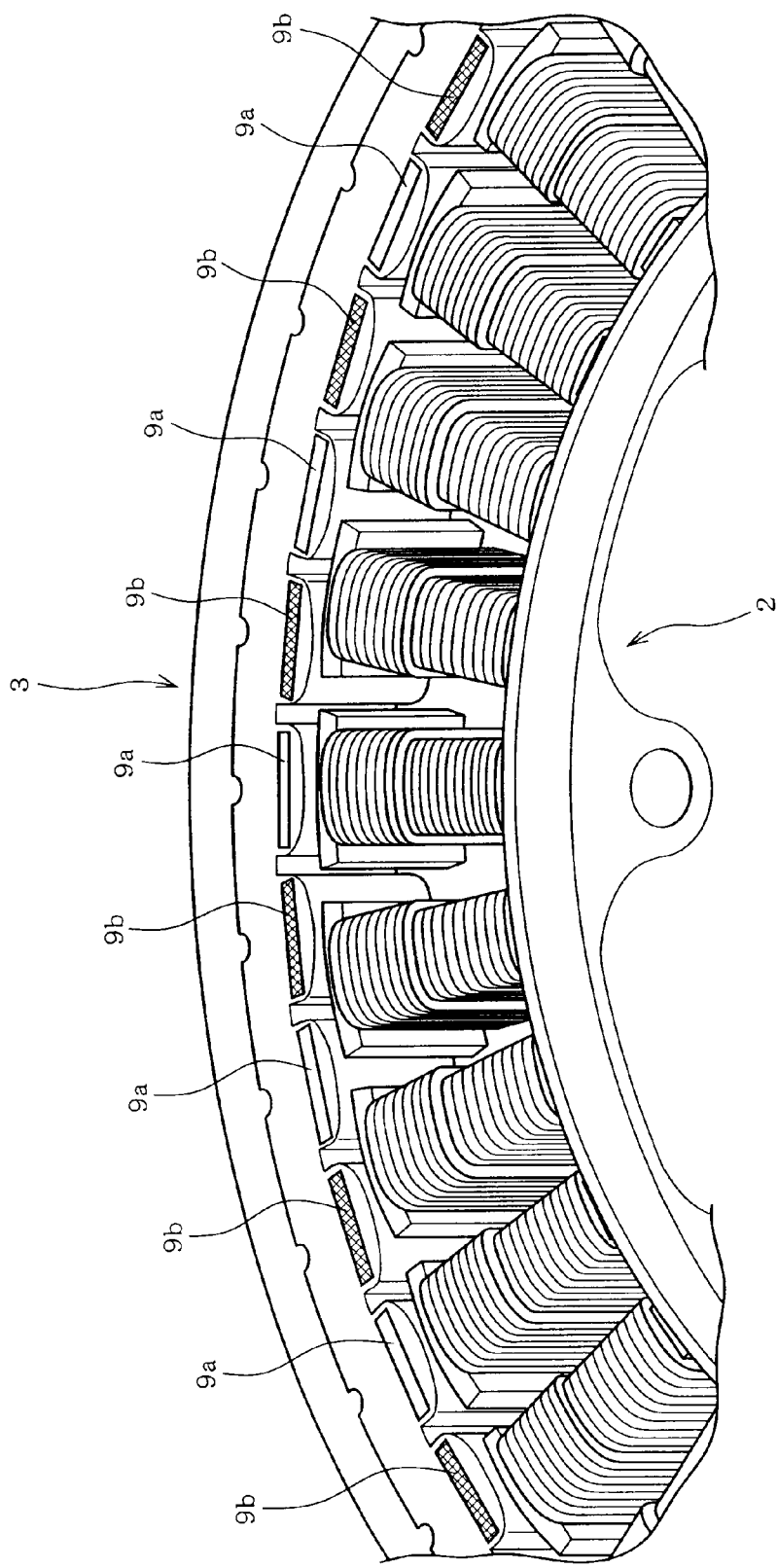
FIG. 6 is a view similar to FIG. 5, showing the arrangement that permanent magnets having smaller and larger coercive forces are arranged alternately.

FIG. 6 shows an arrangement that two types of permanent magnets 9a and 9b having different coercive forces are arranged alternately per pole. In this case, a component ratio of the permanent magnets 9a and 9b is set to 1:1. Each samarium-cobalt magnet 9b with the smaller coercive force has a smaller residual flux density than each neodymium magnet 9a with the larger coercive force. On the other hand, the component ratio of the permanent magnets 9a and 9b having the respective larger and smaller coercive forces is set to 3:1 in the permanent magnet motor 1 of the embodiment as described above with reference to FIG. 5. The arrangement of FIG. 5 in which the component ratio is set to 3:1 can increase the total amount of flux of the permanent magnet motor 1 as compared with the arrangement of FIG. 6 in which the component ratio is set to 1:1.

Figure 7:
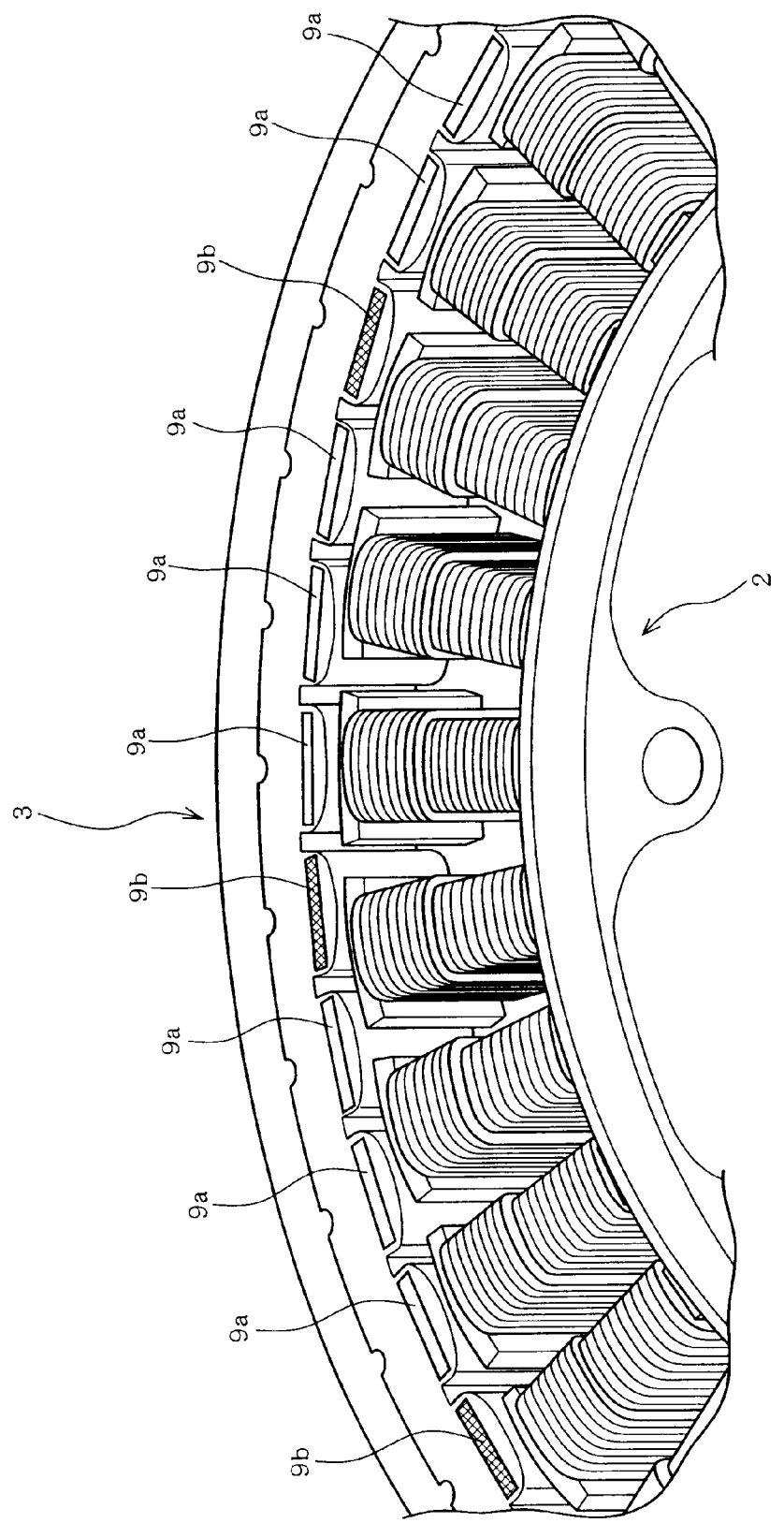
FIG. 7 is a view similar to FIG. 5, showing the arrangement that permanent magnets each having a smaller coercive force, the number of which is reduced by half, are arranged at regular intervals.

The permanent magnets 9 are arranged so that the boundary between the permanent magnets 9a and 9b adjacent to each other is electrically out of phase with two nearest boundaries between the permanent magnets, as described above. The reason for this arrangement will now be described as follows. FIG. 7 shows the arrangement of the permanent magnets 9 obtained by thinning out the samarium-cobalt magnets 9b in the arrangement of FIG. 6 in which the component ratio is set to 1:1. More specifically, the number of samarium-cobalt magnets 9b each having the smaller coercive force is reduced by half, and the permanent magnets 9a and 9b are arranged at regular intervals. In this case, a component ratio of the neodymium magnets 9a and the samarium-cobalt magnets 9b is set to 3:1.

An induced voltage in the permanent magnet motor 1 as described above will be described with reference to FIGS. 8A and 8B. For the sake of easiness in the description, an amount of magnetic flux of each samarium-cobalt magnet 9b is represented as "80" when an amount of magnetic flux of each neodymium magnet 9a takes the value of "100." The induced voltage is a relative value determined on the basis of the amount of magnetic flux in the following description.

Firstly, when the rotor 3 assumes a position as shown in FIG. 1 (position 1), an induced voltage (an effective value) in the phase U coil U1 of a stator winding 5 takes the value of "80" since the induced voltage is generated by the magnetic flux of one samarium-cobalt magnet 9b opposed mainly to the phase U coil U1. An induced voltage in the phase U coil U2 also takes the value of "80" since the induced voltage is generated by the magnetic flux of one samarium-cobalt magnet 9b opposed mainly to the phase U coil U2. More specifically, in this case, the induced voltage of the entire phase U coil is obtained as "80" by averaging the induced voltages of the phase U coils U1 and U2.

Figures 8A, 8B:
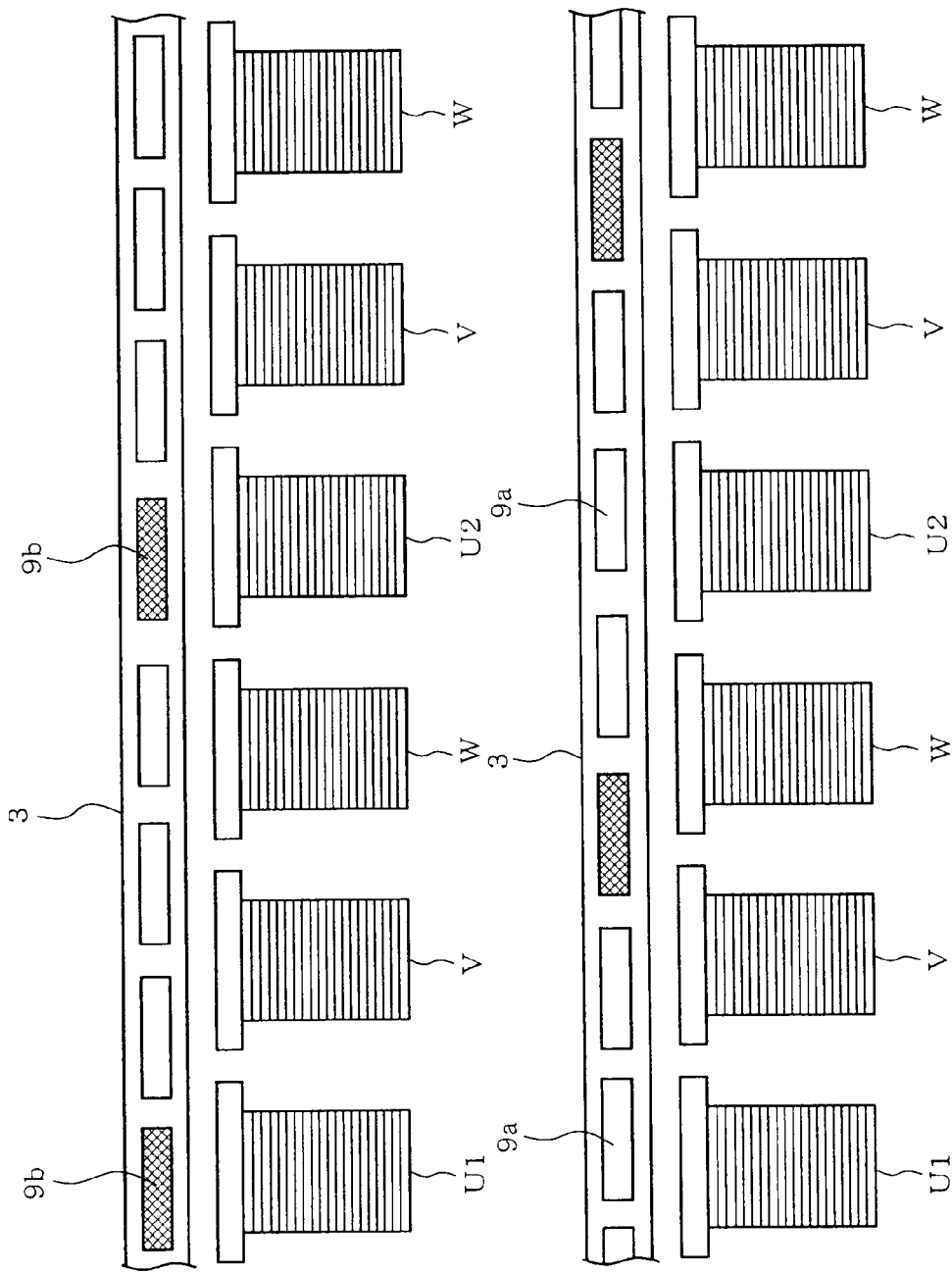
FIGS. 8A and 8B are views for explaining voltage induced when permanent magnets each having a smaller coercive force are arranged at regular intervals.

Next, when the rotor 3 assumes a position as shown in FIG. 8B (position 2), an induced voltage (an effective value) in the phase U coil U1 takes the value of "100" since the induced voltage is generated by the magnetic flux of one neodymium magnet 9a opposed mainly to the phase U coil U1. An induced voltage in the phase U coil U2 also takes the value of "100" since the induced voltage is generated by the magnetic flux of one neodymium magnet 9a opposed mainly to the phase U coil U2. More specifically, in this case, the induced voltage of the entire phase U coil is obtained as "100" by averaging the induced voltages of the phase U coils U1 and U2. Thus, the induced voltage in the phase U coils changes from "80" to "100" in the course of rotation of the rotor 3 from position 1 to position 2. This renders non-uniform the magnetic flux contributing to torque generation between the phase U coils at the stator 2 side and the permanent magnets 9 at the rotor 3 side, thereby resulting in torque ripple and/or cogging torque.

An induced voltage in the permanent magnet motor 1 of the embodiment will now be described with reference to FIGS. 9A and 9B. In the permanent magnet motor 1 of the embodiment, the intervals at which the samarium-cobalt magnets 9b are arranged differs from the spacing between the teeth 4b corresponding to the winding (coil) of the same phase as the samarium-cobalt magnets 9b and vice versa. In this arrangement, the permanent magnets 9 are arranged so that the boundary between the permanent magnets 9a and 9b adjacent to each other is electrically out of phase with two nearest boundaries between the permanent magnets. Furthermore, the permanent magnets 9 are arranged so that each samarium-cobalt magnet 9b having the relatively smaller coercive force is prevented from being opposed to two adjacent windings with the same phase simultaneously, for example, phase U coils U1 and U2, as shown in FIGS. 9A and 9B. Still furthermore, the permanent magnets 9 are arranged so that when each samarium-cobalt magnet 9b having the relatively smaller coercive force is opposed mainly to either one of two adjacent windings with the same phase (the phase U coil U1 in FIG. 9A, and the phase U coil U2 in FIG. 9B, for example), each neodymium magnet 9a having a relatively larger coercive force is opposed mainly to the other of the two adjacent windings with the same phase (the phase U coil U1 in FIG. 9A, and the phase U coil U2 in FIG. 9B, for example).

Accordingly, firstly, when the rotor 3 assumes the position as shown in FIG. 9A (position 1), an induced voltage in phase U coil U1 takes the value of "80" since the induced voltage is generated by the magnetic flux of one samarium-cobalt magnet 9b mainly opposed to the phase U coil U1. Furthermore, an induced voltage in phase U coil U2 takes the value of "100" since the induced voltage is generated by the magnetic flux of one neodymium magnet 9a mainly opposed to the phase U coil U2. More specifically, in this case, the induced voltage of the entire phase U coil is obtained as "90" by averaging the induced voltages of the phase U coils U1 and U2.

Next, when the rotor 3 assumes the position as shown in FIG. 9B (position 2), an induced voltage in phase U coil U1 takes the value of "100" since the induced voltage is generated by the magnetic flux of one neodymium magnet 9a mainly opposed to the phase U coil U1. Furthermore, an induced voltage in phase U coil U2 takes the value of "80" since the induced voltage is generated by the magnetic flux of one samarium-cobalt magnet 9b mainly opposed to the phase U coil U2. More specifically, in this case, the induced voltage of the entire phase U coil is obtained as "90" by averaging the induced voltages of the phase U coils U1 and U2. Thus, the induced voltage in the phase U coils is maintained at the value of "90" in the course of rotation of the rotor 3 from position 1 to position 2. This results in suppression of torque ripple and/or cogging torque.

Although the phase U of the stator windings 5 has been exemplified, each of the phases V and W works in the same manner as described above and achieves the same effect as described above. The coils of each phase are connected in series to one another.

Each one of two types of permanent magnets 9a and 9b forms one magnetic pole and is arranged so that the direction of magnetization thereof follows an axial direction of the permanent magnet motor 1 (the direction from the periphery of the permanent magnet motor 1 toward a gap between the stator 2 and the rotor 3), as shown in FIGS. 4, 9A and 9B. When the two types of permanent magnets 9a and 9b are arranged so that the boundary between the permanent magnets 9a and 9b adjacent to each other is electrically out of phase with two nearest boundaries between the permanent magnets and so that the direction of magnetization follows the radial direction, the adjacently disposed permanent magnets 9 (the neodymium magnet 9a and the samarium-cobalt magnet 9b or the neodymium magnets 9a) have respective poles located opposite each other (for example, the north pole (N) of one of the magnets 9 is located inside and the north pole (N) of the other magnet 9 is located outside). Consequently, a magnetic path (magnetic flux) is established, for example, in the directions of arrows B in FIG. 4 between the neodymium magnet 9a and the samarium-cobalt magnet 9b. Broken line arrows in FIG. 4 denote magnetic flux routed through the rotor core 8. As the result of the above-described construction, a magnetic path is established so as to pass through each neodymium magnet 9a with a larger coercive force and each samarium-cobalt magnet 9b with a smaller coercive force, and another magnetic path is established so as to pass through the two neodymium magnets 9a.

Figure 10:
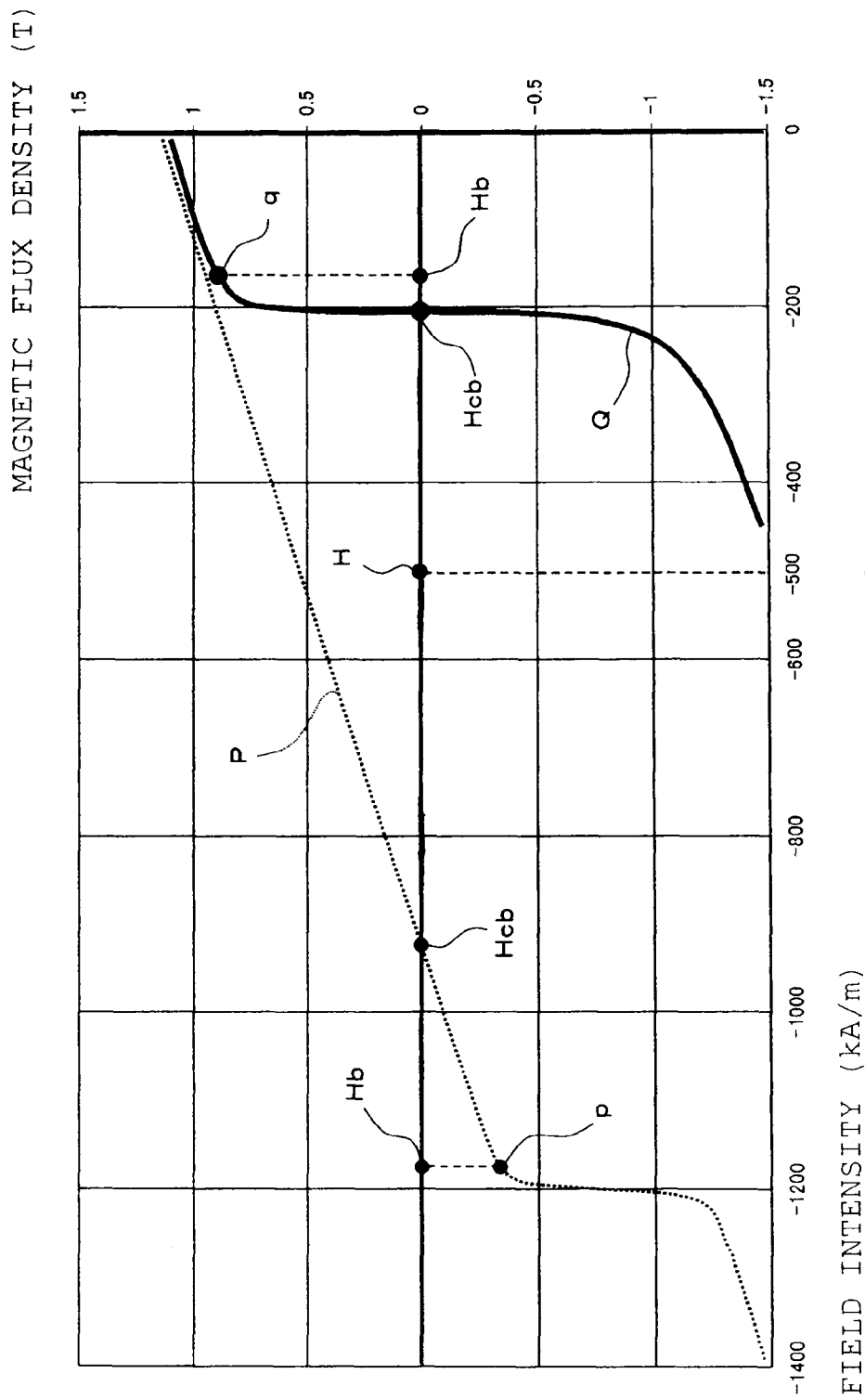
FIG. 10 is a graph showing the relationship between a flux density and field intensity of a permanent magnet.

Referring to FIG. 10, the magnetic characteristic of each samarium-cobalt magnet 9b will be described. FIG. 10 shows the relationship between a flux density and field intensity of a permanent magnet. In FIG. 5, a second quadrant is defined as a domain in which the magnetic flux density is larger than 0 and the field intensity is smaller than 0. A third quadrant is defined as a domain in which the magnetic flux density is smaller than 0 and the field intensity is smaller than 0. Furthermore, dot line P in FIG. 10 denotes a magnetic characteristic of each neodymium magnet 9a and solid line Q denotes a magnetic characteristic of each samarium-cobalt magnet 9b.

The magnetic characteristic of each samarium-cobalt magnet 9b (the relationship between the magnetic flux density and the field intensity) is set so that a bending point q is present in the second quadrant in a temperature range which is determined according to an electric motor to be used, for example, 0° C. to 40° C. The flux density is larger than 0 and the field intensity is smaller than 0 in the second quadrant. Furthermore, a field intensity Hb at the bending point q has an absolute value that is not more than 500 kA/m as denoted by symbol H in FIG. 10.

When the bending point q is in the second quadrant, the field intensity Hb at the bending point q is substantially the same as a coercive force Hcb of the permanent magnet. The coercive force Hcb is proportional to an intensity of magnetic field to be established by the permanent magnet. Accordingly, a larger absolute value (|Hcb|) of the coercive force Hcb is preferred. Furthermore, the field intensity Hb at the bending point q is proportional to an intensity of external field necessary to change the intensity (magnetic flux) of the permanent magnet (to be magnetized or demagnetized). The intensity of external field necessary to change the intensity of the permanent magnet is proportional to a winding current (current flowing through the stator winding 5) at the time of change in the magnetic flux. Accordingly, a larger absolute value (|Hcb|) of the coercive force Hcb is preferred in order that the intensity of external field necessary to change the intensity of the permanent magnet may be rendered as small as possible.

The characteristic increasing the absolute value (|Hcb|) of the coercive force Hcb is contradictory to the characteristic decreasing the absolute value (|Hcb|) of the field intensity Hb at the bending point q and vice versa. When the two characteristics contradictory to each other are synthesized, a larger absolute value of a ratio of the coercive force Hcb to the field intensity Hb at the bending point (|Hcb/Hb|) is preferred. In this case, the coercive force Hcb and the field intensity Hb at the bending point are negative values respectively.

The absolute value (|Hcb|) of the coercive force Hcb is smaller than the absolute value of the field intensity Hb when the bending point p is in the third quadrant as of each neodymium magnet 9a (see dot line P in FIG. 10). Accordingly, the absolute value of the aforesaid ratio (|Hcb/Hb|) is smaller than 1. On the other hand, the absolute value (|Hcb|) of the coercive force Hcb is equal to or larger than the absolute value of the field intensity Hb when the bending point q is in the second quadrant as of the samarium-cobalt magnet 9b (see solid line Q in FIG. 10). Accordingly, the absolute value of the ratio (|Hcb/Hb|) is equal to or larger than 1. Consequently, the case where the bending point is in the second quadrant is preferable to the case where the bending point is in the third quadrant. A section of the magnetic characteristic curve on the left of the bending point has a slope that is almost vertical. As a result, the absolute value of the ratio is not changed to a large degree in the case of the samarium-cobalt magnet 9b having the bending point q in the second quadrant.

When household appliances such as the drum type washing and drying machine 21 are used in a home, current consumption per electrical system is generally set at about 15 A. Accordingly, it is economically preferable that motor driving elements and control system circuit elements have respective rated currents with an upper limit of 15 A. These elements have respective short-time ratings which are about twice as large as the upper limit, that is, 30 A. When the doubled current is applied to the permanent magnet motor 1, a field intensity at the bending point is obtained by back calculation on the basis of current necessary for flux change in the permanent magnets. The obtained field intensity is about 500 kA/m. Accordingly, it is desirable that the field intensity at the bending point is equal to or smaller than 500 kA/m. Furthermore, when the bending point q is in the second quadrant as in the samarium-cobalt magnet 9b, a variation range of an amount of magnetic flux is large, and a ratio of winding current necessary for change in an amount of magnetic flux to the variation range of the amount of magnetic flux can be rendered minimum.

Figure 11:
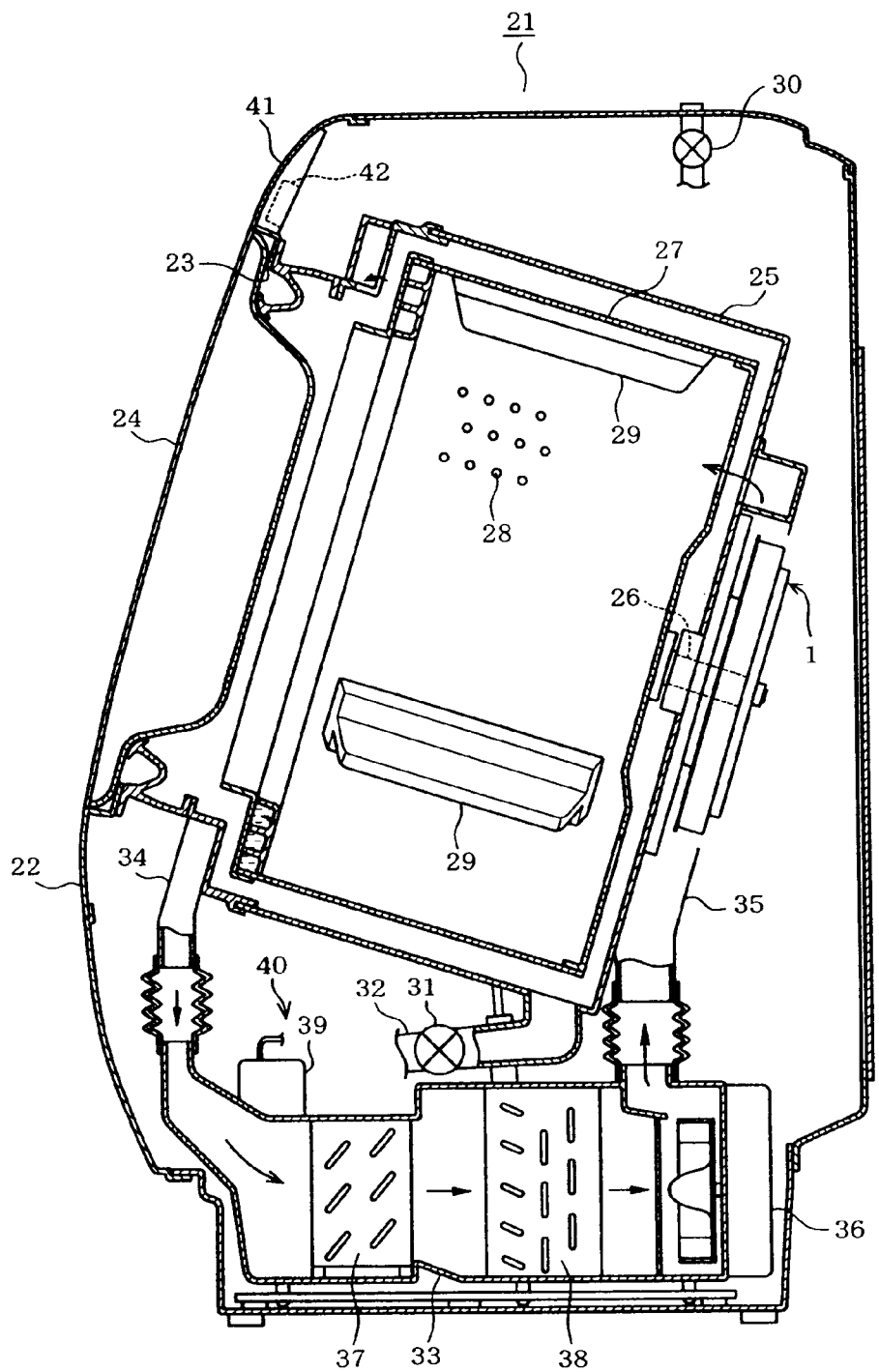
FIG. 11 is a schematic longitudinal sectional view of a drum washing machine provided with the permanent magnet motor.
Figure 12:
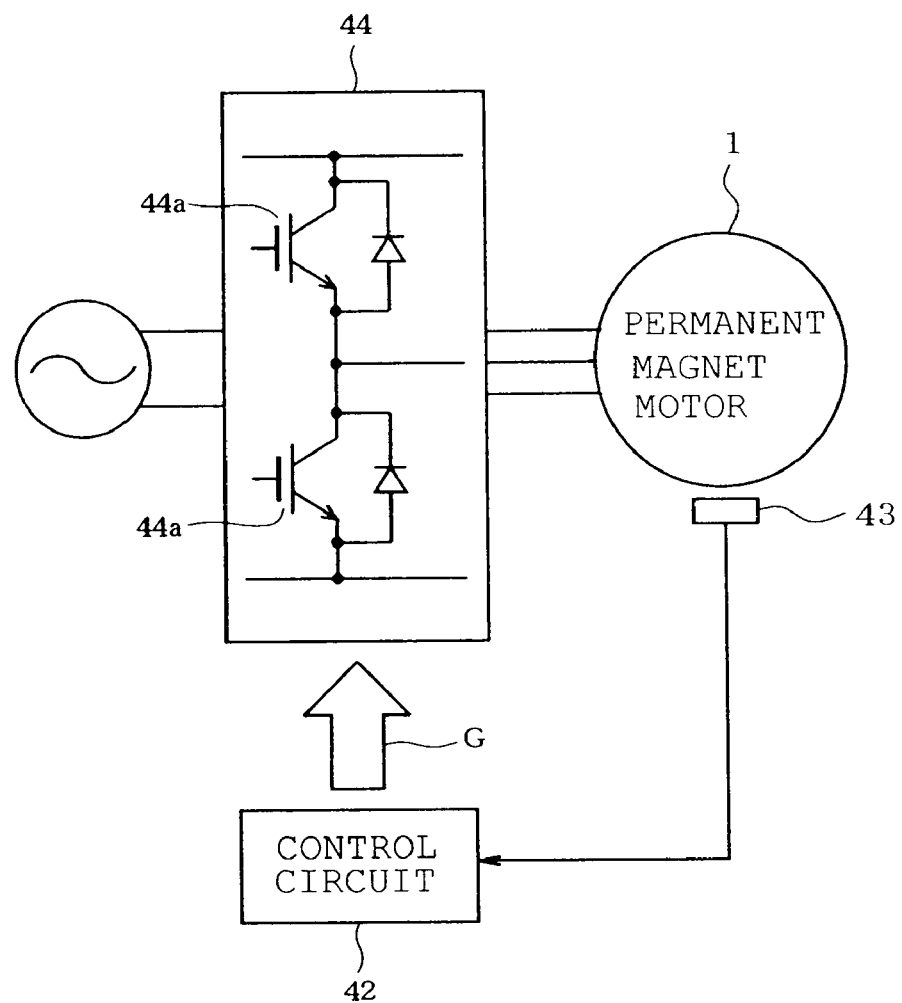
FIG. 12 is a schematic block diagram showing an electrical arrangement of the drum washing machine.

The following describes the construction of the drum type washing and drying machine provided with the above-described permanent magnet motor 1 with reference to FIGS. 11 and 12. The drum type washing and drying machine 21 includes an outer cabinet 22 which serves as an outer casing and has a front formed with a circular laundry access opening 23, as shown in FIG. 11. The access opening 23 is closed and opened by a door 24. A cylindrical water tub 25 is disposed in the outer cabinet 22. The water tub 25 has a closed rear and accordingly a bottom. The above-described permanent magnet motor 1 (the stator 2) is secured by screws to the central rear of the water tub 25. The permanent magnet motor 1 has a rotational shaft 26 with a rear end (right end as viewed in FIG. 11) fixed to the shaft mounting portion 10 of the permanent magnet motor 1 (the rotor 3) and a front end protruding into the water tub 25. A bottomed cylindrical drum 27 with a closed rear is fixed to the front end of the rotational shaft 26 so as to be coaxial with the water tub 25. The drum 27 is rotated together with the rotor 3 and the rotational shaft 26 by the permanent magnet motor 1. The drum 27 has a plurality of circulation holes 28 through which air and water are allowed to pass therethrough. The drum 27 further has a plurality of baffles 29 scraping and disentangling laundry in the drum 27.

A water-supply valve 30 is connected to the water tub 25. When the water-supply valve 30 is opened, water is supplied into the water tub 25. Furthermore, a drain hose 32 provided with a drain valve 31 is connected to the water tub 25. When the drain valve 31 is opened, wash liquid in the water tub 25 is discharged through the drain hose 32. A ventilating duct 33 extending in the front-back direction is mounted below the water tub 25 in the outer cabinet 22. The ventilating duct 33 has a front end connected through a front duct 34 to the water tub 25 and a rear end connected through a rear duct 35 to the water tub 25. A ventilating fan 36 is provided in the rear end of the ventilating duct 33. Air in the water tub 25 is fed through the front duct 34 into the ventilating duct 33 and is returned through the rear duct 35 into the water tub 25 as shown by arrows in FIG. 11.

An evaporator 37 is provided in the ventilating duct 33 so as to be located at the front end side. A condenser 38 is provided in the ventilating duct 33 so as to be located at the rear end side. The evaporator 37 and the condenser 38 constitute a heat pump 40 together with a compressor 39 and a throttle valve (not shown). In operation of the heat pump 40, air flowing through the ventilating duct 33 is dehumidified by the evaporator 37 and heated by the condenser 38, thereafter being circulated into the water tub 25.

An operation panel 41 is mounted on a front of the outer cabinet 22 so as to be located over the door 24. A plurality of operation switches (not shown) are mounted on the operation panel 41 to set an operation course and the like. The operation panel 41 is electrically connected to a control circuit 42 (serving as a control). The control circuit 42 mainly comprises a microcomputer and controls an overall operation of the drum type washing and drying machine 21. The control circuit 42 executes various operation courses while controlling the permanent magnet motor 1, water-supply valve 30, drain valve 31, compressor 39, throttle valve and the like according to the contents set on the operation panel 41 based on a control program (not shown).

A magnetic sensor 43 (see FIG. 12) is provided on a portion of the motor 1 opposed to the permanent magnets 9 to detect magnetism of the permanent magnets 9. The magnetic sensor 43 is mounted on a circuit board (not shown) further mounted on the stator 2 side. The control circuit 42 computes a rotational position of the rotor 3 based on a detection signal supplied thereto from the magnetic sensor 43. The control circuit 42 generates a gate drive signal G according to results of computation to drive an inverter circuit 44 comprising six insulated gate bipolar transistors (IGBTs) 44a connected into a three-phase bridge configuration. Only two of the IGBTs 44a are shown in FIG. 12. Consequently, the control circuit 42 rotates the rotor 3 while controlling energization to the stator windings 5.

The following describes the operation of the drum type washing and drying machine provided with the permanent magnet motor 1. When the control circuit 42 drives the inverter circuit 44 to energize the stator winding 5, external field due to armature reaction (magnetic field produced by the current flowing through the stator winding 5) acts on the permanent magnets 9a and 9b of the rotor 3. Each samarium-cobalt magnet 9b having a smaller coercive force is magnetized or demagnetized by the external field due to the armature reaction. As a result, a flux content interlinked with the stator winding 5 (interlinkage flux) can be increased or decreased. In the embodiment, the control circuit 42 controls energization to the stator windings 5 so that the magnetization state of each samarium-cobalt magnet 9b is changed for every operation step (wash, dehydration and drying steps).

Operations in the respective operation steps will now be described in sequence. Firstly, the control circuit 42 opens the water-supply valve 30 to supply water into the water tub 25 in the wash step. The control circuit 42 then rotates the drum 27 so that washing is carried out. In the wash step, the drum 27 needs to be rotated with high torque in order that laundry containing water may be scraped upward, although a rotational speed is low. In this case, the control circuit 42 controls energization to the stator winding 5 by the inverter circuit 44 so that the samarium-cobalt magnets 9b are magnetized. As a result, since a flux content acting on the stator winding 5 is increased such that a magnetic force is intensified, the drum 27 can be rotated with high torque at low speeds.

The control circuit 42 then opens the drain valve 31 to discharge wash liquid out of the water tub 25 in the dehydration step. The control circuit 42 subsequently causes the drum 27 to be rotated at high speeds so that laundry is dehydrated. In the dehydration step, the drum 27 needs to be rotated at high speeds for improvement in a dehydration efficiency, although torque is low. The control circuit 42 then controls energization to the stator windings 5 by the inverter circuit 44 so that the samarium-cobalt magnets 9b are demagnetized. As a result, since an amount of magnetic flux acting on the stator windings 5 is decreased such that a magnetic force is weak, the drum 27 can be rotated with low torque at high speeds.

Finally, the control circuit 42 drives the ventilating fan 36 and the heat pump 40 and rotates the drum 27 in the drying step, thereby drying laundry. In the drying step, the control circuit 42 controls energization to the stator windings 5 by the inverter circuit 44 so that the samarium-cobalt magnets 9b are magnetized for a subsequent wash step. Consequently, an amount of magnetic flux acting on the stator windings 5 can previously be increased. Accordingly, the drum 27 can readily be rotated with high torque at low speeds in a subsequent wash step.

According to the foregoing embodiment, two types of permanent magnets 9a and 9b having different coercive forces are provided. The samarium-cobalt magnets 9b each having a smaller coercive force are magnetized or demagnetized by the external field due to the armature reaction. As a result, an amount of magnetic flux of the permanent magnets 9 can be adjusted according to a load to be driven (the drum 27 of the drum type washing and drying machine 21 in the embodiment). This can prevent an amount of magnetic flux of the permanent magnets 9 from being constant and further prevent dielectric breakdown during high-speed rotation and power reduction during low-speed rotation.

Moreover, the two types of permanent magnets 9a and 9b having different coercive forces are disposed substantially in an annular arrangement so that each type constitutes one magnetic pole. This simple construction can realize adjustment of flux content of the permanent magnets 9 according to the load to be driven (the drum 27). Furthermore, the total amount of flux of the permanent magnet motor 1 can be increased by appropriately reducing the proportion of the samarium-cobalt magnets 9b each having a smaller coercive force and a smaller residual flux density. Furthermore, even when the two types of permanent magnets 9a and 9b having different coercive forces and different residual flux densities are arranged in different proportions, non-uniforming the amount of magnetic flux can be suppressed. This can suppress the torque ripple and/or cogging torque both of which are produced when the permanent magnets 9a and 9b having respective larger and smaller coercive forces are not arranged alternately. Additionally, the amount of magnetic flux can efficiently be adjusted according to the operation steps in the drum washer-drier of the embodiment.

Figure 13:
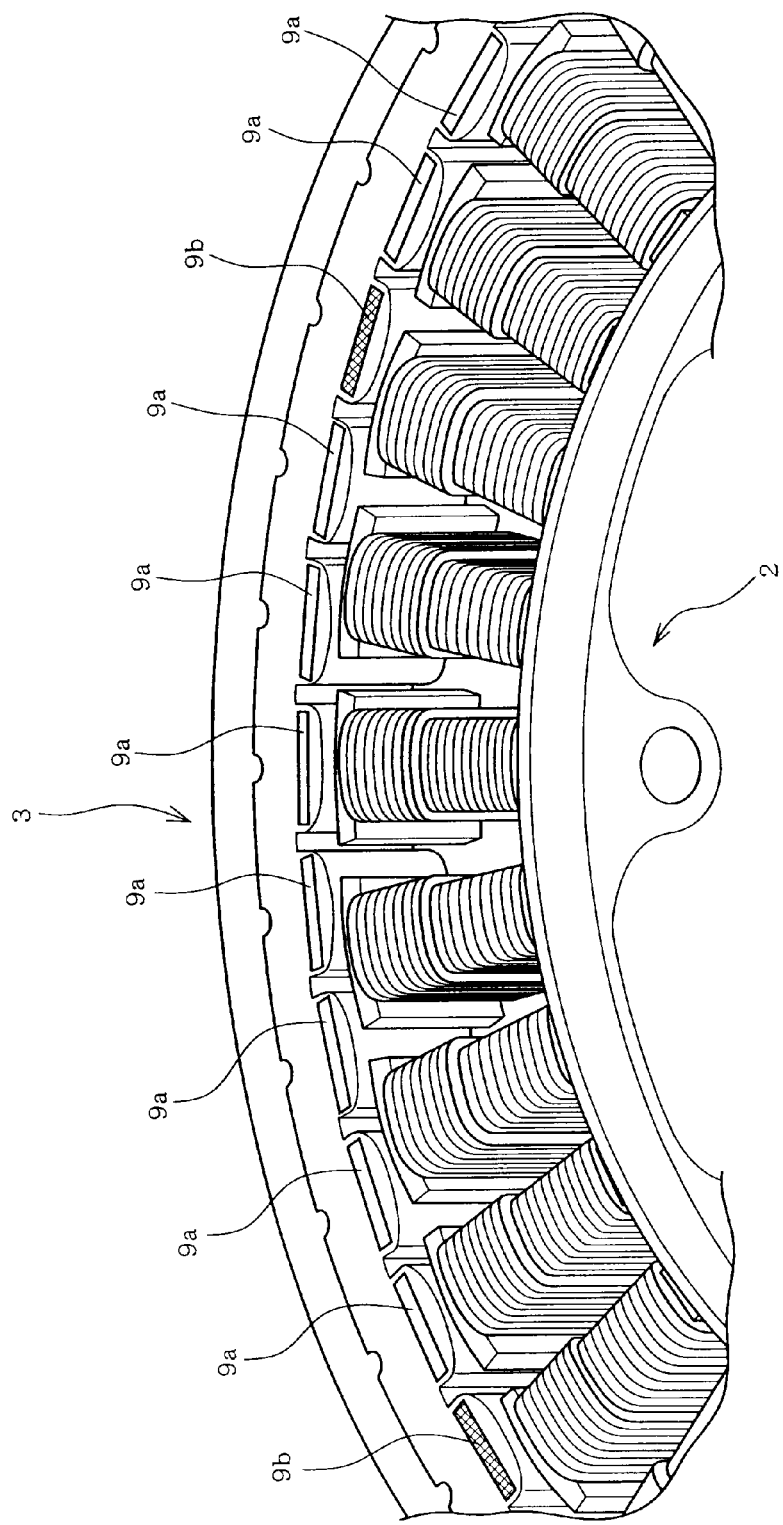
FIG. 13 is a view similar to FIG. 5, showing the permanent magnet motor in accordance with a second embodiment of the invention.

FIGS. 13, 14A and 14B illustrate a second embodiment. Identical or similar parts in the second embodiment are labeled by the same reference symbols as those in the first embodiment and accordingly, the description of these parts will be eliminated. In the second embodiment, the proportion of the samarium-cobalt magnets 9b each having the smaller coercive force is further reduced as compared with the foregoing embodiment.

FIG. 13 shows one group of eight permanent magnets 9 including seven neodymium magnets 9a and one samarium-cobalt magnet 9b all of which are arranged sequentially. Six groups of permanent magnets 9 are arranged to constitute the permanent magnet motor 1 (the rotor 3). The neodymium and samarium-cobalt magnets 9a and 9b both having respective larger and smaller coercive forces have the component ratio of 7:1.

The induced voltage in the permanent magnet motor 1 having the above-described arrangement will now be described with reference to FIGS. 14A and 14B. Firstly, when the rotor 3 assumes the position as shown in FIG. 14A (position 1), an induced voltage in phase U coil U1 takes the value of "80" since the induced voltage is generated by the magnetic flux of one samarium-cobalt magnet 9b mainly opposed to the phase U coil U1. Furthermore, an induced voltage in phase U coil U2 takes the value of "100" since the induced voltage is generated by the magnetic flux of one neodymium magnet 9a mainly opposed to the phase U coil U2. More specifically, in this case, the induced voltage of the entire phase U coil is obtained as "90" by averaging the induced voltages of the phase U coils U1 and U2.

Next, when the rotor 3 assumes the position as shown in FIG. 14B (position 2), an induced voltage in phase U coil U1 takes the value of "100" since the induced voltage is generated by the magnetic flux of one neodymium magnet 9a mainly opposed to the phase U coil U1. Furthermore, an induced voltage in phase U coil U2 takes the value of "80" since the induced voltage is generated by the magnetic flux of one samarium-cobalt magnet 9b mainly opposed to the phase U coil U2. More specifically, in this case, the induced voltage of the entire phase U coil is obtained as "90" by averaging the induced voltages of the phase U coils U1 and U2. Thus, the induced voltage in the phase U coils is maintained at the value of "90" in the course of rotation of the rotor 3 from position 1 to position 2. This results in suppression of torque ripple and/or cogging torque.

According to the second embodiment, the percentage of the samarium-cobalt magnets 9b each having a smaller coercive force is reduced, and the neodymium magnets 9a each having a larger coercive force and the samarium-cobalt magnets 9b have the structural ratio of 7:1. Consequently, the total amount of magnetic flux of the permanent magnet motor 1 can further be increased. Furthermore, non-uniforming the amount of magnetic flux can also be suppressed in the second embodiment. This can suppress the torque ripple and/or cogging torque both of which are produced when the permanent magnets 9a and 9b having respective larger and smaller coercive forces are not arranged alternately.

The foregoing embodiments should not be restrictive and can be modified or expanded as follows. The permanent magnet having the smaller coercive force should not be limited to the samarium-cobalt magnet 9b. Any magnet may be used that has such a low coercive force that an amount of magnetization is variable by an external field due to armature reaction. The permanent magnets each having such a smaller coercive force include an alnico magnet (aluminum-nickel-cobalt magnet), a ferrite magnet or the like. Also, the permanent magnet having the larger coercive force should not be limited to the neodymium magnet 9a. Accordingly, the combination of two types of permanent magnets having different coercive forces should not be limited to the combination of the neodymium and samarium-cobalt magnets 9a and 9b. A combination of the neodymium magnet 9a and an alnico magnet or another combination may be used, instead. It is preferable that a coercive force of one type of permanent magnet is about twice as large as a coercive force of the other type of permanent magnet or above.

Furthermore, the permanent magnets 9 should not be limited to two types. Three, four or five types of permanent magnets having different coercive forces may be employed. In this case, the control circuit 42 may be arranged to change the magnetization state of the permanent magnets having a relatively smaller coercive force at every operation step.

Means for adjusting the flux content of each permanent magnet 9 should not be limited to the arrangement of controlling energization to the stator windings 5 by the inverter circuit 44. For example, a winding other than the stator windings 5 may be provided and controlled so as to be energized and de-energized.

The permanent magnet motor 9 should not be limited to the 48-pole 36-slot winding arrangement. The permanent magnet motor 9 may be any type of motor having an 8-pole 6-slot winding arrangement (a combination of 4-pole 3-slot winding arrangement) as a basic unit. Furthermore, the permanent magnet motor 9 may be any type of motor having a 4-pole 6-slot winding arrangement, a 10-pole 6-slot winding arrangement, a 12-pole 6-slot winding arrangement or the like, for example.

The permanent magnet motor 1 of the invention may be applied to washing machines with no drying function and vertical axis type washing machines in which a tub is rotated about a vertical axis, instead of the foregoing drum type washing and drying machine 21. Furthermore, the invention may be applied to inner rotor type permanent magnet motors in which a rotor is disposed along an inner circumference of a stator, instead of the foregoing outer rotor type permanent magnet motor 1. Additionally, the permanent magnet motor 1 of the invention may be used as a motor for driving a compressor of air conditioners or the like.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A permanent magnet motor which includes a rotor and a stator, comprising:
a plurality of permanent magnets forming a plurality of magnetic poles in a core of the rotor; and
magnetic pole teeth provided so as to correspond to phase windings of the stator,
wherein the permanent magnets include a plurality of types of permanent magnets having different coercive forces and arranged substantially into an annular shape so that one type of the permanent magnet constitutes each magnetic pole; and
the permanent magnets each having a relatively smaller coercive force are arranged at a first interval in the rotor, and the magnetic pole teeth corresponding to the same phase windings are arranged at a second interval differing from the first interval in the stator.

2. The permanent magnet motor according to claim 1, wherein the plurality of types of permanent magnets have pole numbers differing from each other.

3. The permanent magnet motor according to claim 1, wherein the plurality of types of permanent magnets have a component ratio that is set so that the permanent magnets each having a relatively larger coercive force has a larger number than the permanent magnets each having a relatively smaller coercive force.

4. The permanent magnet motor according to claim 1, wherein the permanent magnets include two types of the permanent magnets having different coercive forces.

5. The permanent magnet motor according to claim 4, wherein one type of the permanent magnet has a coercive force twice as small or large as the other type of the permanent magnet or above.

6. The permanent magnet motor according to claim 1, wherein the permanent magnets each having a relatively smaller coercive force have a magnetic flux density and a magnetic field strength both of which are interrelated so that a folding point is in a second quadrant of an orthogonal coordinate system within a temperature range used.

7. The permanent magnet motor according to claim 6, wherein a magnetic field strength at the folding point is not more than 500 kA/m.

8. The permanent magnet motor according to claim 1, wherein each permanent magnet comprises a rare-earth magnet.

9. A washing machine comprising:
a permanent magnet motor which includes a rotor, a stator, a plurality of permanent magnets forming a plurality of magnetic poles in a core of the rotor, and magnetic pole teeth provided so as to correspond to phase windings of the stator; and
a control which controls drive of the permanent magnet motor,
wherein the permanent magnet motor includes a plurality of types of permanent magnets having different coercive forces and forming a plurality of magnetic poles in a core of a rotor, the permanent magnets being arranged substantially into an annular shape so that one type of the permanent magnet constitutes each magnetic pole, and magnetic pole teeth provided so as to correspond to phase windings of the stator,
the permanent magnets each having a relatively smaller coercive force are arranged at a first interval in the rotor, and the magnetic pole teeth corresponding to the same phase windings are arranged at a second interval differing from the first interval in the stator; and
the control is arranged so as to change a magnetization state of the permanent magnets having a relatively smaller coercive force.

10. The washing machine according to claim 9, wherein the plurality of types of permanent magnets have pole numbers differing from each other.

11. The washing machine according to claim 9, wherein the plurality of types of permanent magnets have a component ratio that is set so that the permanent magnets each having a relatively larger coercive force has a larger number than the permanent magnets each having a relatively smaller coercive force.

12. The washing machine according to claim 9, wherein the permanent magnets includes two types of the permanent magnets having different coercive forces.

13. The washing machine according to claim 12, wherein each type of the permanent magnet has a coercive force twice as small or large as the other type of the permanent magnet or above.

14. The washing machine according to claim 9, wherein the permanent magnets each having a relatively smaller coercive force have a magnetic flux density and a magnetic field strength both of which are interrelated so that a folding point is in a second quadrant of an orthogonal coordinate system within a temperature range used.

15. The washing machine according to claim 14, wherein a magnetic field strength at the folding point is not more than 500 kA/m.

16. The washing machine according to claim 9, wherein each permanent magnet comprises a rare-earth magnet.

17. The washing machine according to claim 9, wherein the control is arranged so as to change the magnetization state of the permanent magnets having the relatively smaller coercive force per operation step.

18. The washing machine according to claim 17, wherein the operation step includes wash, dehydration and drying steps.

* * * * *